(12) United States Patent
Horwood et al.

(10) Patent No.: US 11,845,542 B2
(45) Date of Patent: Dec. 19, 2023

(54) ARRANGEMENT FOR AVOIDING CLASHING BETWEEN AN ACTUATION ASSEMBLY AND AN UPPER COVER OF A FOLDING WING TIP

(71) Applicant: AIRBUS OPERATIONS LIMITED, Bristol (GB)

(72) Inventors: Jack Horwood, Bristol (GB); Paul Morrell, Bristol (GB); Matt Harding, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 260 days.

(21) Appl. No.: 17/296,644

(22) PCT Filed: May 21, 2020

(86) PCT No.: PCT/EP2020/064207
§ 371 (c)(1),
(2) Date: May 25, 2021

(87) PCT Pub. No.: WO2020/239606
PCT Pub. Date: Dec. 3, 2020

(65) Prior Publication Data
US 2022/0024558 A1    Jan. 27, 2022

(30) Foreign Application Priority Data
May 24, 2019  (GB) ..................................... 1907362

(51) Int. Cl.
*B64C 3/56*    (2006.01)
(52) U.S. Cl.
CPC ...................................... B64C 3/56 (2013.01)

(58) Field of Classification Search
CPC .................................. B64C 3/56; B64U 20/50
See application file for complete search history.

(56) References Cited

U.S. PATENT DOCUMENTS 5,222,653 A * 6/1993 Joyce ........................ B64C 9/22
                                                    228/173.6
5,372,336 A   12/1994 Paez
(Continued)

FOREIGN PATENT DOCUMENTS

EP    3 059 161    8/2016
GB    2 530 578    3/2016
(Continued)

OTHER PUBLICATIONS

International Search Report for PCT/EP2020/064207 dated Sep. 3, 2020, 4 pages.
(Continued)

*Primary Examiner* — Rodney A Bonnette
(74) *Attorney, Agent, or Firm* — Nixon & Vanderhye P.C.

(57) ABSTRACT

An aircraft wing having a fixed wing and a wing tip device rotatable about a hinge at the tip of the fixed wing is disclosed. The wing further includes an actuation assembly for rotating the wing tip device about the hinge. The upper cover of the wing tip device includes an offset region extending inboard of the hinge axis, such that when the wing tip device is rotated to the ground configuration, the offset region extends into a space previously-occupied by the actuation assembly, but is outside the space occupied by the actuation assembly in the ground configuration.

11 Claims, 5 Drawing Sheets

(56) References Cited

U.S. PATENT DOCUMENTS

| | | | |
|---|---|---|---|
| 5,379,969 A | 1/1995 | Marx et al. | |
| 5,899,410 A * | 5/1999 | Garrett | B64C 39/068 244/45 R |
| 2013/0292508 A1 | 11/2013 | Fox | |
| 2014/0061371 A1 | 3/2014 | Good et al. | |
| 2014/0117151 A1 * | 5/2014 | Fox | B64C 23/072 244/49 |
| 2016/0251075 A1 * | 9/2016 | Thompson | B64C 23/072 244/198 |
| 2017/0137110 A1 | 5/2017 | Harding et al. | |
| 2018/0001992 A1 * | 1/2018 | Kracke | B64C 3/56 |

FOREIGN PATENT DOCUMENTS

| | | |
|---|---|---|
| WO | 2015/150835 | 10/2015 |
| WO | 2019/034432 | 2/2019 |

OTHER PUBLICATIONS

Written Opinion of the Isa for PCT/EP2020/064207 dated Sep. 3, 2020, 9 pages.
Combined Search and Examination Report for GB1907362.6 dated Oct. 15, 2019, 5 pages.

* cited by examiner

ARRANGEMENT FOR AVOIDING CLASHING BETWEEN AN ACTUATION ASSEMBLY AND AN UPPER COVER OF A FOLDING WING TIP

CROSS REFERENCE TO RELATED APPLICATIONS

The present application is a National Phase of International Application Number PCT/EP2020/064207 filed May 21, 2020, which designated the U.S. and claims priority benefits from Great Britain Application Number GB 1907362.6 filed May 24, 2019, the entire contents of each of which are hereby incorporated by reference.

BACKGROUND OF THE INVENTION

There is a trend towards increasingly large passenger aircraft, for which it is desirable to have correspondingly large wing spans. However, the maximum aircraft span is effectively limited by airport operating rules which govern various clearances required when maneuvering around the airport (such as the span and/or ground clearance required for gate entry and safe taxiway usage).

Therefore, folding wing tip devices have been introduced into passenger aircraft, where a wing tip device is movable between a flight configuration for use during flight, and a ground configuration for use during ground-based operations. In the ground configuration, the wing tip device is moved away from the flight configuration such that the span of the aircraft wing is reduced, thereby allowing use of existing gates and safe taxiway usage.

When the wing tip device is moved relative to the fixed wing, to reach the ground configuration, it is necessary to avoid clashing between these two structures. In some known arrangements, the interface and/or nature of the rotation of the wing tip device is designed in a manner to avoid clashes. An example of such an arrangement is disclosed in WO 2015/150835. In other arrangements, the wing tip device is rotated about a hinge. Examples of such an arrangement are disclosed in US2017/137110, US2013/292508 and US 2014/061371. WO2019/034432 also discloses an aircraft with a hinged wing tip, together with an actuation unit for actuating the foldable wing tip portion.

With hinged wing tip devices, it can be challenging providing a geometry that avoids clashing of the structures, yet also fulfils other important design criteria. Examples of such other design criteria that may need fulfilling are: providing a suitable wing geometry in the flight configuration (e.g. having an aerodynamically efficient profile); having effective sealing between wing tip device and fixed wing; accommodating actuation mechanisms within the wing; and/or accommodating the physical structure of the hinge.

The present invention seeks to mitigate the above-mentioned problems. Alternatively or additionally, the present invention seeks to provide an improved wing tip device arrangement.

SUMMARY OF THE INVENTION

According to a first aspect of the invention, there is provided an aircraft wing, the aircraft wing comprising a fixed wing and a wing tip device rotatable about a hinge axis of a hinge at the tip of the fixed wing between: (i) a flight configuration for use during flight and (ii) a ground configuration for use during ground-based operations, in which ground configuration the wing tip device is moved away from the flight configuration such that the span of the aircraft wing is reduced. The wing further comprises an actuation assembly for rotating the wing tip device about the hinge, and wherein in the flight configuration the actuation assembly is in a first configuration occupying a first space, and in the ground configuration the actuation assembly is in a second configuration occupying a second space. The upper cover of the wing tip device comprises an offset region extending inboard of the hinge axis, the offset region and the actuation assembly being arranged such that when the wing tip device is rotated to the ground configuration, the offset region extends into the first space, but is outside the second space.

Such an arrangement may mitigate the need to move a part of the wing tip device/fixed wing out of the path of the other of the fixed wing/wing tip device (for example it may avoid the need for a separately moveable part of the cover to be moved to avoid a clash). This may reduce the number of moving parts and may therefore provide a relatively simple and low maintenance arrangement.

In the above-mentioned aspect of the invention, the offset region extends inboard of the hinge axis. Providing an offset region of the upper cover that extends inboard of the hinge axis is typically not possible because the resulting movement of the offset region, as the wing tip begins to rotate to the ground configuration, would be into the structure of the fixed wing and would create a clash. Aspects of the present invention recognise that when the wing comprises an actuation assembly that occupies different spaces in the flight and ground configurations, such a clash may be avoided by ensuring the upper cover extends into the space freed up my the movement of the actuator mechanism.

The wing comprises an actuation assembly for rotating the wing tip device about the hinge. In the flight configuration the actuation assembly is in a first configuration occupying a first space. In the first configuration the components of the actuation assembly may be in a first set of relative positions. In the ground configuration the actuation assembly is in a second configuration occupying a second space. In the second configuration the components of the actuation assembly may be in a second set of relative positions (different to the first set of relative positions). The first and second spaces may be the volume defined by the structure of the actuation assembly in each of the respective configurations.

The actuation assembly may comprises a drive. The drive may be a rotary drive. The rotary drive may be arranged to drive a moveable element to move the wing tip device between the flight configuration and the ground configuration. The rotary drive may be arranged to drive the moveable element in a curved path to move the wing tip device between the flight configuration and the ground configuration. The rotary drive may be arranged with an axis of rotation that is parallel to the hinge axis. The rotary drive may be arranged with an axis of rotation that is parallel to and coincident with the hinge axis. The rotary drive may comprise a geared rotary actuator (GRA). The rotary drive may comprise a pinion. The moveable element may comprise a rack for being driven by rotation of the pinion. The rack may be a curved rack for moving along the curved path. The curved path may be curved around the hinge axis. The curved rack may be curved around the hinge axis. An actuation unit having some of the above-mentioned features of the actuation assembly, is disclosed in WO2019/034432.

Aspects of the present invention have been found especially beneficial because they may enable such potentially-advantageous actuation assemblies to be used, whilst avoiding clashing during movement to the ground configuration. The above-described actuation assemblies comprising a curved rack have been identified as especially suitable for use in the present invention because the first and second spaces may differ significantly, for example due to the movement of the curved rack.

In the first configuration of the actuation assembly, the moveable element may be within part of the first space. In the second configuration of the actuation assembly, the moveable element may have been driven along the curved path to move it outside that part of the first space. In the second configuration of the actuation assembly, the moveable element is in the second space.

The offset region of the upper cover may be fixed relative to the moveable element of the actuation assembly. During rotation of the wing tip device between the flight configuration and the ground configuration, the offset region of the upper cover may move with the moveable element of the actuation assembly.

The offset region is preferably integral with the remainder of the upper cover of the wing tip device. The upper cover of the wing tip device may comprise a primary region. The primary region may cover the wing box of the wing tip device. The offset region may be fixed relative to the primary region of the upper cover. The offset region may be an extension of the primary region.

The wing comprises a hinge. The hinge may comprises a hinge structure. The hinge may comprise a plurality of lugs of the wing tip device. The hinge may comprise a plurality of lugs on the fixed wing. The plurality of lugs on the wing tip device may interleave the plurality of lugs on the fixed wing. The plurality of lugs on the wing tip device may be rotatable about the hinge axis relative to the plurality of lugs on the fixed wing. The hinge may comprise two sets of interleaving lugs, each set of interleaving lugs comprising a plurality of the lugs of the wing tip device interleaving a plurality of the lugs on the fixed wing.

The two sets of interleaving lugs may be spaced apart along the hinge axis. The offset region of the upper cover may extend into the spacing between the two sets of lugs. The offset region of the upper cover may extend substantially across the whole of the spacing between the two sets of lugs. Such an arrangement may be beneficial in reducing the number of seals required within this region of the hinge. Such an arrangement may be beneficial in reducing the number of gaps/steps in the upper surface of the wing thereby ensuring a relatively smooth aerodynamic profile in the vicinity of the hinge.

The actuation assembly may be located between the two sets of interleaving lugs. The offset region may extend above the actuation assembly. Such an arrangement may be beneficial in ensuring the actuation assembly is adequately protected from the outside environment.

The wing may comprise a sealing arrangement. The sealing arrangement may be for creating a seal between the offset region and the surrounding structure (for example the surrounding structure of the fixed wing when the wing tip is in the flight configuration). The seal may be created along the distal free end, and more preferably along substantially all the free edges, of the offset region. The seal is preferably arranged to seal the interior of the wing from airflow over the wing. The seal is preferably a compression seal. The seal may comprise a P-seal. The seal may be supported on a seal support structure.

In the flight configuration the distal free end of the offset region may adjoin the upper cover of the fixed wing along an interface. The interface is offset inboard from the hinge axis of the wing tip device.

The hinge axis may extend through the depth of the wing (for example it may pass through the wing box). Such an arrangement tends to be desirable so that at least some of the structure of the hinge is accommodated within the depth of the wing and does not unduly impact on the aerodynamics of the wing. The interface may be vertically offset from the hinge axis.

The interface may be arranged such that an edge of the upper cover of the fixed wing overlaps the adjoining edge of the offset region of the upper cover of the wing tip device. As the wing tip device rotates from the flight configuration to the ground configuration, the offset region may be moved downwardly away from the upper cover of the fixed wing along the overlap region. The above-mentioned arrangement may be beneficial during return movement of the wing tip device from the ground configuration to the flight configuration. The wing may be configured such that during return movement from the ground configuration to the flight configuration, the offset region and the upper cover of the fixed wing contact each other along the overlap region. A sealing arrangement may be provided in the overlap region. The above-mentioned arrangement may be beneficial in that it enables the edge of the upper cover of the fixed wing to hold the end of the offset region in place once the wing tip device is in the flight configuration. This may reduce the likelihood of deflections of the offset region during flight (for example due to relatively low pressure air across the upper cover).

The tip of the fixed wing may comprise a wing box. The wing box may have a pair of ribs. The wing box may have a pair of spars. The wing box may have an upper and lower cover. The wing tip device, and preferably the root of the wing tip device, may comprise wing tip box. The wing tip box may comprise a pair of wing tip spars. The wing tip box may comprise a pair of wing tip ribs. The wing tip box may comprise the wing tip upper cover. The wing tip box may comprise a wing tip lower cover. When the wing tip is in the flight configuration, the upper and lower covers of the wing tip box may be continuations of the upper and lower covers of the wing box. In the flight configuration, the offset region may be flush with the adjoining upper covers.

Embodiments of the invention may be beneficial where the moveable element, or part of the moveable element is housed in the wing box. The actuation mechanism may be at least partially housed in the wing box of the fixed wing. A rotary drive may be housed in the wing box of the fixed wing. The moveable element, for example a curved rack, may extend out of the wing box of the fixed wing.

According to another aspect of the invention, there is provided an aircraft incorporating the aircraft wing of the first aspect.

According to another aspect of the invention, there is provided a folding wing tip arrangement for an aircraft wing, the arrangement comprising a fixed wing and a hinged wing tip device at the tip thereof, the wing tip device being configurable by a wing tip actuator between: (i) a flight configuration for use during flight and (ii) a ground configuration for use during ground-based operations, in which ground configuration the wing tip device is moved away from the flight configuration such that the span of the aircraft wing is reduced. Part of the upper cover of the wing tip device extends inboard of the hinge axis such that upon rotation from the flight configuration to the ground configuration, the part of the upper cover moves downwardly into a free-space within the volume of the wing. The wing tip actuator is configured such that movement of the actuator during actuation of the wing tip device from the flight configuration to the ground configuration exposes the free-space within the volume of the wing into which the upper cover extends.

In embodiments of the present invention, the wing tip device is configurable between: (a) a flight configuration for use during flight and (b) a ground configuration for use during ground-based operations, in which ground configuration the wing tip device is moved away from the flight configuration such that the span of the aircraft wing is reduced. In the flight configuration, the span may exceed an airport compatibility limit. In the ground configuration the span may be reduced such that the span (with the wing tip device in the ground configuration) is less than, or substantially equal to, the airport compatibility limit. The airport compatibility limit is a span limit (for example relating to clearance restrictions for buildings, signs, other aircraft). The compatibility limit is preferably a gate limit.

The wing tip device may be a wing tip extension; for example the wing tip device may be a planar tip extension. In other embodiments, the wing tip device may comprise, or consist of, a non-planar device, such as a winglet.

In the flight configuration the trailing edge of the wing tip device is preferably a continuation of the trailing edge of the fixed wing. The leading edge of the wing tip device is preferably a continuation of the leading edge of the fixed wing. There is preferably a smooth transition from the fixed wing to the wing tip device. It will be appreciated that there may be a smooth transition, even where there are changes in sweep or twist at the junction between the fixed wing and wing tip device. However, there are preferably no discontinuities at the junction between the fixed wing and wing tip device. The upper and the lower surfaces of the wing tip device may be continuations of the upper and lower surfaces of the fixed wing. The span ratio of the fixed wing relative to the wing tip device may be such that the fixed wing comprises at least 70%, 80%, 90%, or more, of the overall span of the aircraft wing.

When the wing tip device is in the ground configuration, the aircraft incorporating the wing, may be unsuitable for flight. For example, the wing tip device may be aerodynamically and/or structurally unsuitable for flight in the ground configuration. The aircraft is preferably configured such that, during flight, the wing tip device is not movable to the ground configuration. The aircraft may comprise a sensor for sensing when the aircraft is in flight. When the sensor senses that the aircraft is in flight, a control system is preferably arranged to disable the possibility of moving the wing tip device to the ground configuration.

In the ground configuration the wing tip device may be held in place. For example the wing tip device may be latched or locked in place to prevent movement back towards the flight configuration.

The aircraft is preferably a passenger aircraft. The passenger aircraft preferably comprises a passenger cabin comprising a plurality of rows and columns of seat units for accommodating a multiplicity of passengers. The aircraft may have a capacity of at least 20, more preferably at least 50 passengers, and more preferably more than 50 passengers. The aircraft is preferably a powered aircraft. The aircraft preferably comprises an engine for propelling the aircraft. The aircraft may comprise wing-mounted, and preferably underwing, engines.

It will of course be appreciated that features described in relation to one aspect of the present invention may be incorporated into other aspects of the present invention. For example, the method of the invention may incorporate any of the features described with reference to the apparatus of the invention and vice versa.

Some features herein may have be described with reference to a direction of movement from one configuration (for example the flight configuration) to another configuration (for example the ground configuration). It will be appreciated that the features may also have been equally described, in the reverse motion, with reference to the movement in the opposition direction, and such features will be understood to be disclosed herein.

DESCRIPTION OF THE DRAWINGS

Embodiments of the present invention will now be described by way of example only with reference to the accompanying schematic drawings of which:

FIG. 1b shows a schematic view of an aircraft incorporating wings according to FIG. 1a;

FIG. 2b is a section view through A-A in FIG. 2a;

DETAILED DESCRIPTION

Figure 1A:
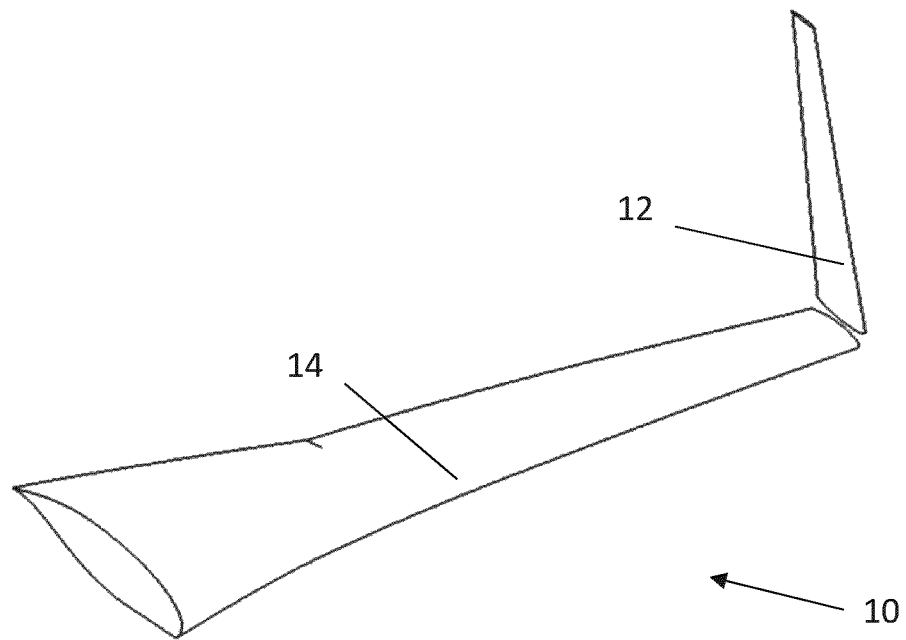
FIG. 1a shows a schematic view of an aircraft wing according to a first embodiment of the invention.
Figure 1B:
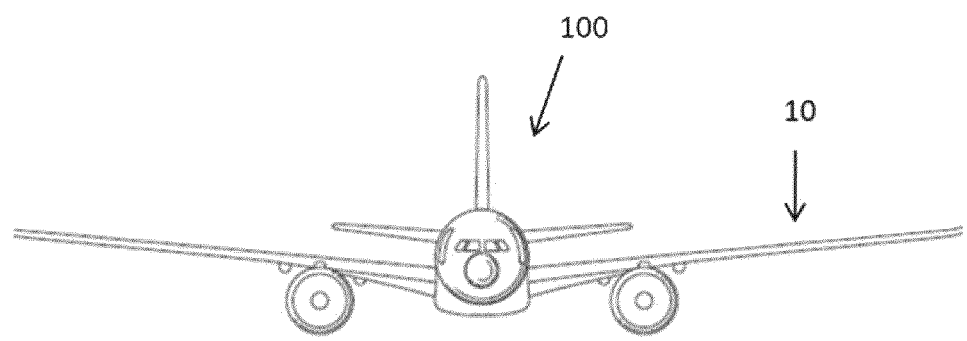

FIG. 1a shows a wing 10 comprising a wing tip device 12 and a fixed wing 14. The wing tip device 12 is configurable between: (i) a flight configuration for use during flight, as shown in FIG. 1b and (ii) a ground configuration for use during ground-based operations, as shown in FIG. 1a, in which ground configuration the wing tip device 12 is moved away from the flight configuration such that the span of the aircraft wing 10 is reduced.

The wing tip device 12 comprises an upper cover 26 connected to a wing tip root rib 28. The upper cover 26 forms the outer skin on the upper surface of the wing tip device 12.

The fixed wing 14 comprises an upper cover 30 connected to a tip rib 32. The upper cover 30 forms the outer skin on the upper surface of the fixed wing 14.

FIGS. 2a to 4b show part of the wing 10 in the first embodiment of the invention, and reference will now be made to these Figures.

Figure 2A:
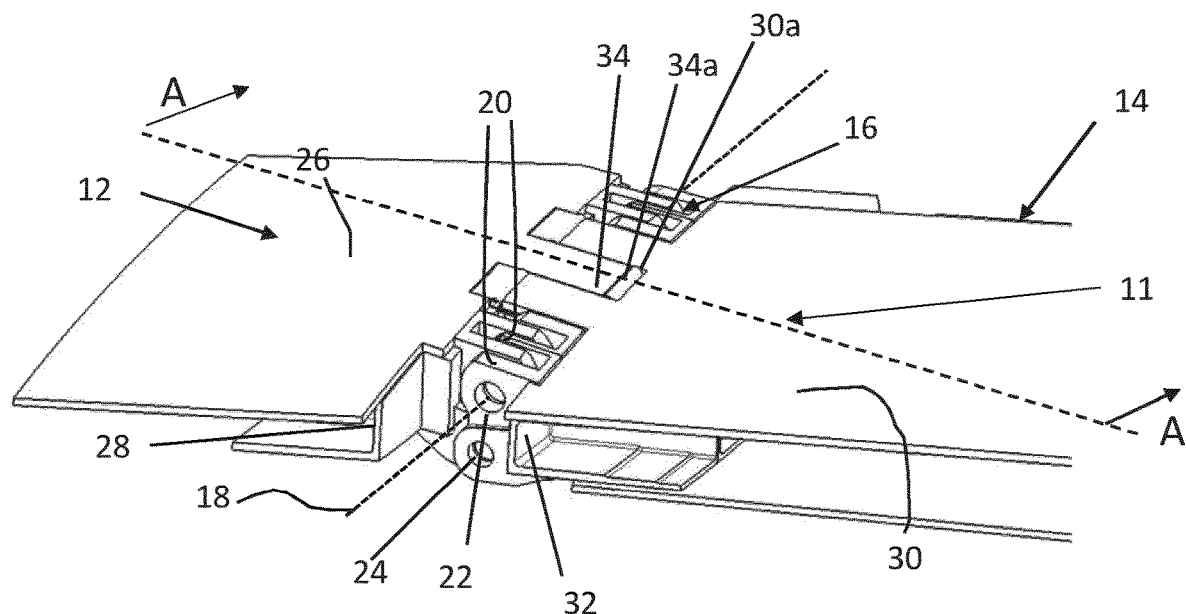
FIG. 2a shows a close-up view of the hinge and the surrounding parts of the wing tip device and fixed wing of FIG. 1a, with some of the other surrounding structure removed for the sake of clarity.
Figure 2B:
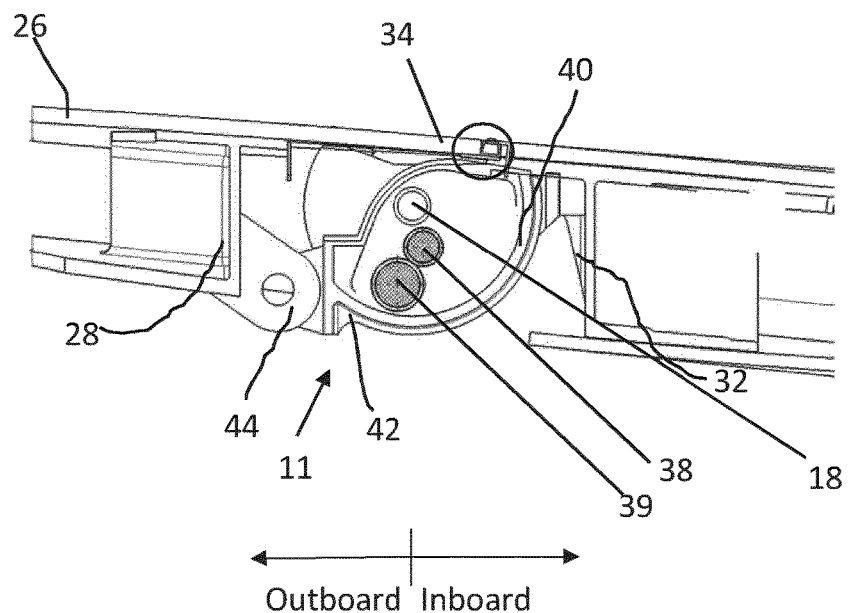
Figure 2C:
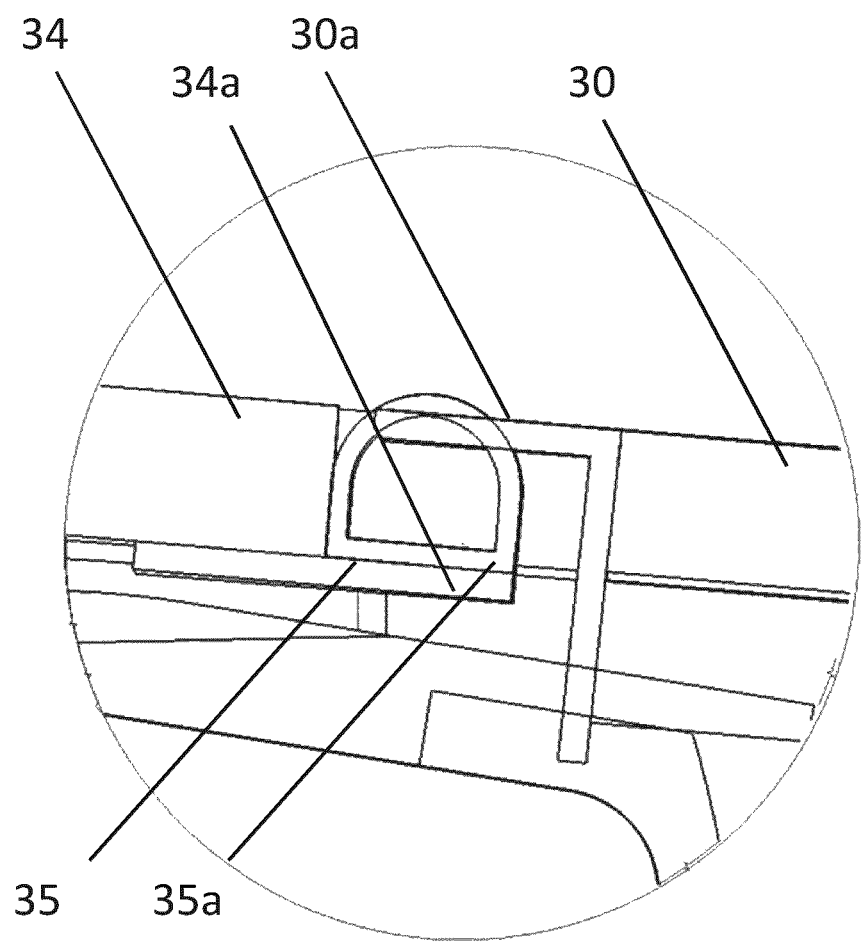
FIG. 2c is a close-up of the overlap region circled in FIG. 2b.
Figure 3A:
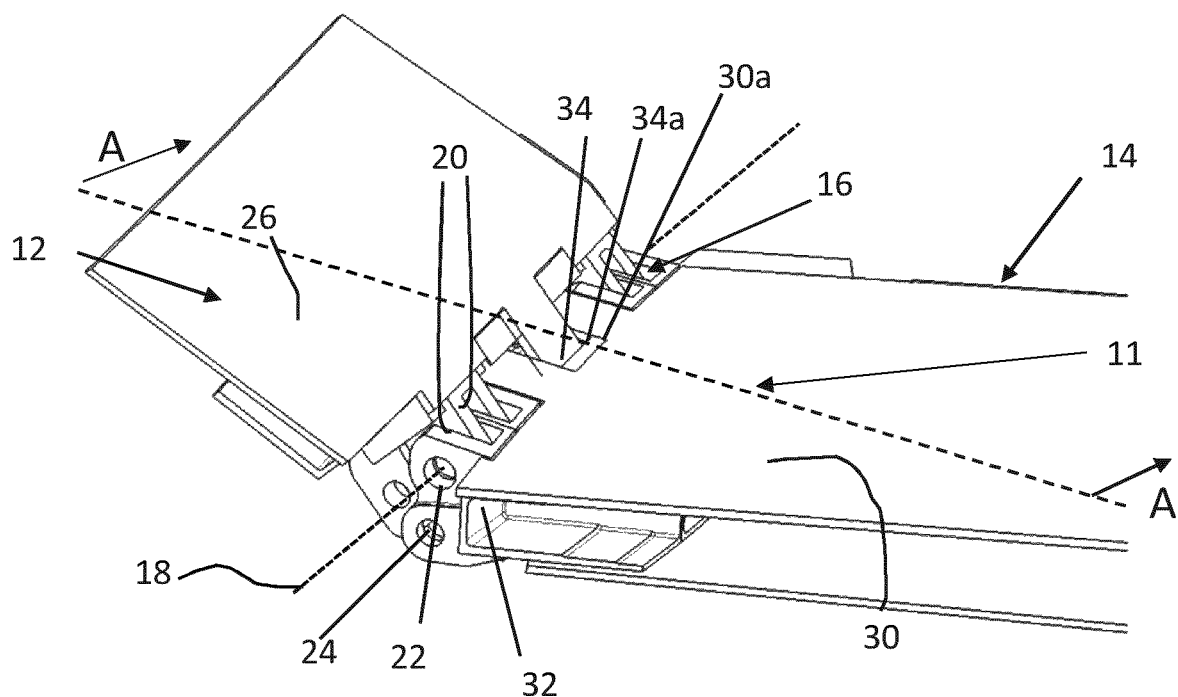
FIGS. 3a and 3b show the corresponding features of the wing in FIGS. 2a and 2b but with the wing tip partially moved from the flight configuration towards the ground configuration.
Figure 3B:
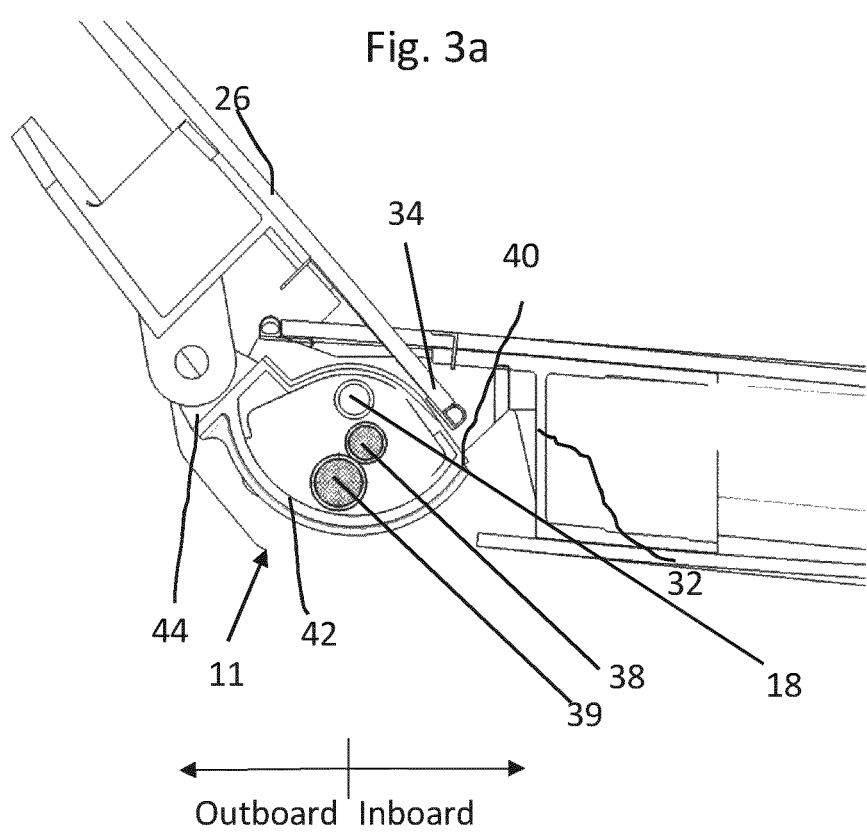
Figure 4A:
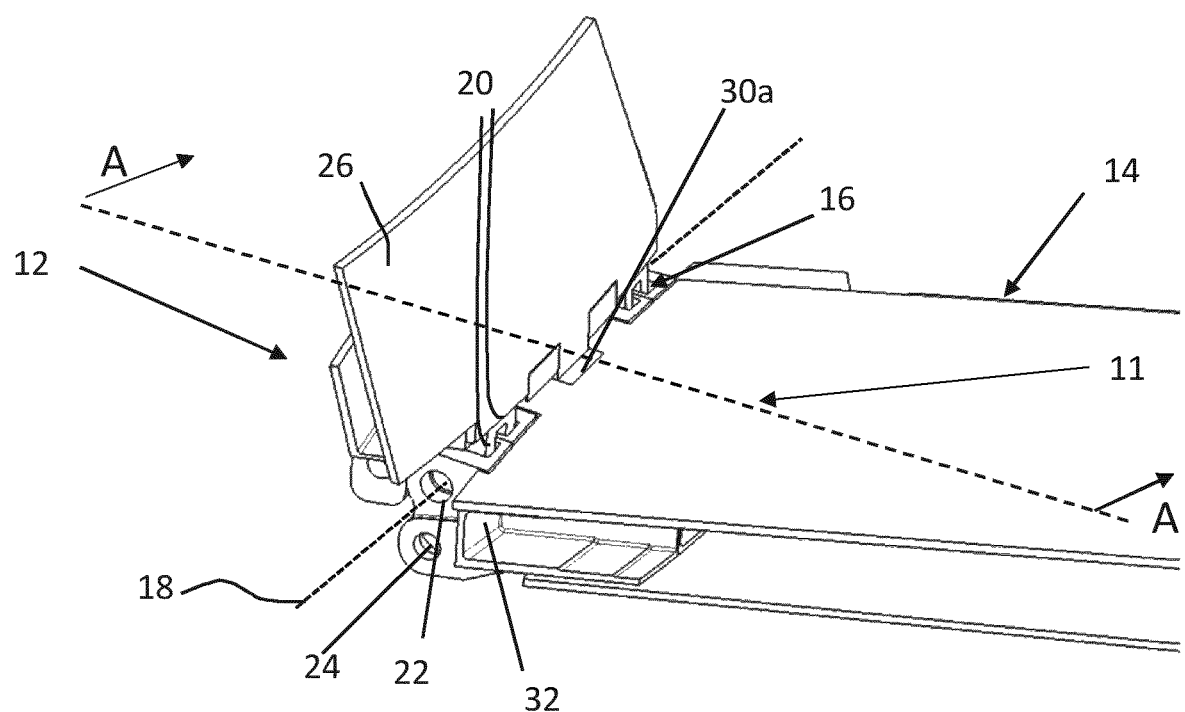
FIGS. 4a and 4b show the corresponding features of the wing in FIGS. 2a and 2b but with the wing tip device in the ground configuration.

FIGS. 2a, 3a and 4a show close-up views of the hinge and of the surrounding parts of the wing tip device 12 and fixed wing 14. The leading and trailing edge structures have been removed for the sake of clarity. It will be appreciated that these leading and trailing edge structures extend fore and aft of the parts of the wing shown in FIGS. 2a-4a.

Referring first to FIG. 2a, the wing 10 comprises the wing tip device 12 and the fixed wing 14. The wing tip device 12 is hinged to the fixed wing about a hinge 16 having a hinge axis 18. The hinge 16 comprises a series of interleaving lugs 20 on the root of the wing tip device 12 and the tip of the fixed wing. The lugs 20 have apertures 22 through which a hinge pin (not shown) extends (the hinge pin being coaxial with the hinge axis 18). The interleaving lugs 20 are provided in two sets, with a space between for accommodating an actuator mechanism (described in more detail below).

The interleaving lugs 20 also comprise a series of lower apertures 24 for receiving locking pins (not shown) to hold the wing tip in the flight configuration. The exact nature of the locking arrangement for holding the wing tip device in the flight configuration is not relevant to the present invention and is not described in detail herein.

The majority of the upper cover 26 of the wing tip device extends up to the edges of the hinge lugs 20. However, the upper cover 26 also comprises an offset region 34 protruding further inboard. As most clearly shown in FIG. 2b, this offset region extends inboard of the hinge axis 18.

In the flight configuration, the cover 26 of the wing tip device and the cover 30 of the fixed wing a substantially flush with each other and form a smooth aerodynamic surface. An edge 30a of the upper cover 30 on the fixed wing (illustrated by a long rectangular panel in FIG. 2a) overlaps the distal free end 34a of the offset region 34 of the wing tip upper cover 26 (shown circled in FIG. 2b and in close up in FIG. 2c).

As illustrated in FIG. 2c, the distal free end 34a of the offset region comprises a sealing support structure 35 extends along the overlap region and supporting a compression P-seal 35a that is compressed (in the flight configuration) by the overlapping end 30a of the fixed wing.

The wing 10 comprises an actuation assembly 11 comprising a geared rotary actuator GRA (not fully visible in the Figures) and a curved rack 40. The curved rack 40 comprises a series of teeth spaced along the curved surface, but these are not illustrated in the Figures. The GRA has an output shaft onto which a pinion gear 38 is mounted. The pinion gear 38 is coupled, via a secondary gear 39, to mesh with the teeth of the curved rack 40. The curved rack 40 includes a support structure 42 which is fixedly attached to a root of the wing tip device 12 via a pair of lugs 44 (only one of which is visible in FIG. 2b).

The GRA is arranged to drive the rack 40 in a curved path to move the wing tip device 12 between the flight configuration (FIG. 2a/2b) and the ground configuration (FIG. 4a/4b). That movement will now be described with reference to FIGS. 3a to 4b.

FIGS. 3a and 3b show the wing tip partially moved from the flight configuration towards the ground configuration. The GRA has rotated the pinion 38 such that the rack is rotated outboard, thereby moving the wing tip device 12 such that it rotates about the hinge axis 18.

The offset region 34 of the upper cover 26 of the wing tip device is fixed relative to the rack 40 of the actuation assembly. It therefore moves as part of the wing tip device.

Since the offset region extends inboard of the hinge axis 18, rotation of the wing tip device about that axis causes the offset region to move downwardly into the wing box of the wing 10. This might be expected to cause a clash with internal structure of the wing. However, in the first embodiment of the invention, the actuation assembly 11 also moves to a different configuration as the wing tip device is rotated. More specifically, the rack 40 rotates about the axis 18, freeing up space that the rack was previously occupying. In the first embodiment of the invention, the offset region 34 of the upper cover 26 moves into this freed up space thereby avoiding a clash.

Figure 4B:
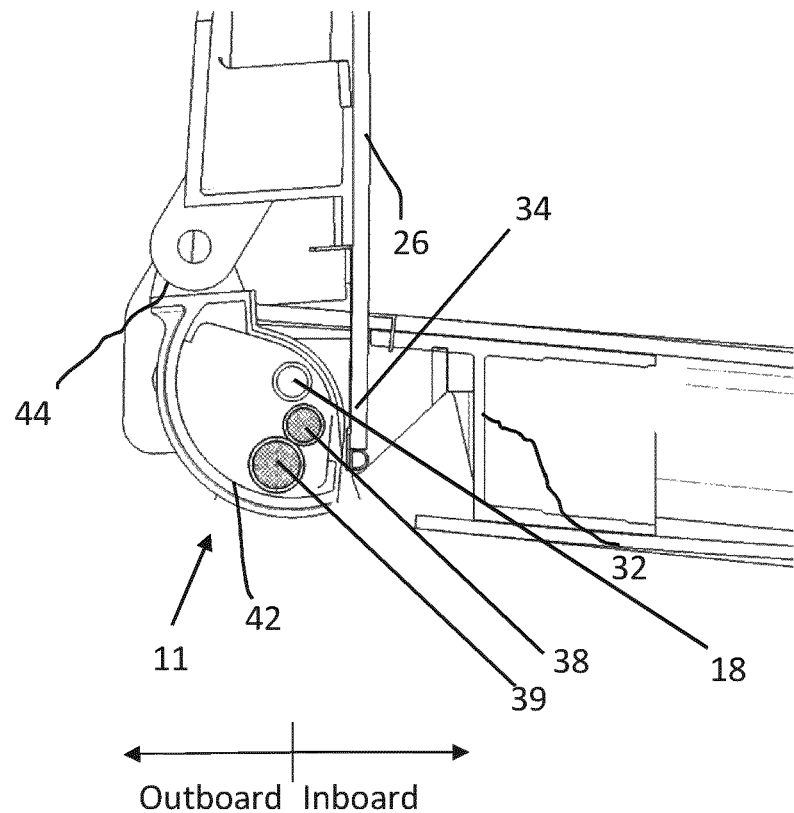

FIGS. 4a and 4b show the wing tip device 12 in the ground configuration, and reference will now be made to these Figures. In the ground configuration, the rack 40 has rotated fully and the rack occupies a different space (i.e. volume in the wing) compared to the space it occupied when the wing tip device was in the flight configuration. The offset region 34 of the upper cover extends into the wing, but it extends into the space previously occupied by the rack (i.e. the space the rack occupied in the flight configuration), but is outside the space occupied by the rack in the ground configuration.

Such an arrangement is advantageous in that it enables the wing tip device 12 to move between the flight and ground configurations without needing to provide a separate moveable panel, or otherwise potentially complex mechanism. Embodiments of the present invention may therefore be relatively simple and low maintenance.

The embodiment in FIGS. 2a to 4b also provides advantages during return of the wing tip device 12 from the ground configuration to the flight configuration: The return movement of the wing tip device 12 to the flight configuration is effected by the reverse rotation of the pinion 38, and hence the reverse movement of the rack 40 along its curved path. By virtue of the overlap of the fixed wing cover 30 with the distal end 34a of the offset region 34, and effective compression seal may be maintained.

Whilst the present invention has been described and illustrated with reference to particular embodiments, it will be appreciated by those of ordinary skill in the art that the invention lends itself to many different variations not specifically illustrated herein.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. An aircraft wing, the aircraft wing comprising a fixed wing and a wing tip device rotatable about a fixed hinge axis of a hinge at the tip of the fixed wing between:
   (i) a flight configuration for use during flight and (ii) a ground configuration for use during ground-based operations, in which ground configuration the wing tip device is moved away from the flight configuration such that the span of the aircraft wing is reduced,
   wherein the wing further comprises an actuation assembly for rotating the wing tip device about the hinge, and wherein in the flight configuration the actuation assembly is in a first configuration occupying a first space, and in the ground configuration the actuation assembly is in a second configuration occupying a second space;
   wherein the upper cover of the wing tip device comprises an end part which extends inboard of the fixed hinge axis,
   wherein the end part and the actuation assembly being arranged such that when the wing tip device is rotated to the ground configuration, the end part extends into the first space, but is outside the second space.

2. A wing according to claim 1, wherein the actuation assembly comprises a rotary drive, the rotary drive being arranged to drive a moveable element in a curved path to move the wing tip device between the flight configuration and the ground configuration.

3. A wing according to claim 2, wherein the rotary drive comprises a pinion, and the moveable element comprises a curved rack for being driven along the curved path by rotation of the pinion.

4. A wing according to claim 2, wherein in the first configuration of the actuation assembly, the moveable element is within part of the first space, but in the second configuration of the actuation assembly the moveable element has been driven along the curved path to move it outside that part of the first space.

5. A wing according to claim 2, wherein the end part of the upper cover is fixed relative to the moveable element of the actuation assembly.

6. A wing according to claim 1, wherein the hinge comprises two sets of interleaving lugs, each set of interleaving lugs comprising a plurality of lugs of the wing tip device interleaving a plurality of lugs on the fixed wing, the plurality of lugs on the wing tip device being rotatable about the fixed hinge axis relative to the plurality of lugs on the fixed wing.

7. A wing according to claim 6, wherein the two sets of interleaving lugs are spaced apart along the fixed hinge axis, and the end part of the upper cover extends into the spacing between the two sets of lugs.

8. A wing according to claim 7, wherein the actuation assembly is located between the two sets of interleaving lugs.

9. A wing according to claim 8, wherein the end part extends above the actuation assembly.

10. A folding wing tip arrangement for an aircraft wing, the arrangement comprising a fixed wing and a hinged wing tip device at the tip thereof, the wing tip device being configurable by a wing tip actuator between:
(i) a flight configuration for use during flight and (ii) a ground configuration for use during ground-based operations, in which ground configuration the wing tip device is moved away from the flight configuration such that the span of the aircraft wing is reduced,
wherein the upper cover of the wing tip device comprises an end part which extends inboard of a fixed hinge axis such that upon rotation from the flight configuration to the ground configuration, the end part of the upper cover moves downwardly into a free-space within the volume of the wing,
and wherein the wing tip actuator is configured such that movement of the actuator during actuation of the wing tip device from the flight configuration to the ground configuration exposes the free-space within the volume of the wing into which the upper cover extends.

11. An aircraft wing, the aircraft wing comprising a fixed wing and a wing tip device rotatable about a hinge axis of a hinge comprising two sets of interleaving lugs, each set of interleaving lugs comprising a plurality of lugs of the wing tip device interleaving a plurality of lugs on the fixed wing, wherein the hinge is at the tip of the fixed wing between:
(i) a flight configuration for use during flight and (ii) a ground configuration for use during ground-based operations, in which ground configuration the wing tip device is moved away from the flight configuration such that the span of the aircraft wing is reduced,
wherein the wing further comprises an actuation assembly for rotating the wing tip device about the hinge, and wherein in the flight configuration the actuation assembly is in a first configuration occupying a first space, and in the ground configuration the actuation assembly is in a second configuration occupying a second space;
wherein the upper cover of the wing tip device comprises an offset region extending inboard of the hinge axis,
the offset region and the actuation assembly being arranged such that when the wing tip device is rotated to the ground configuration, the offset region extends into the first space, but is outside the second space.

* * * * *